June 20, 1944.  G. DREYFUS  2,351,938
PARACHUTE BELT
Filed Feb. 28, 1941
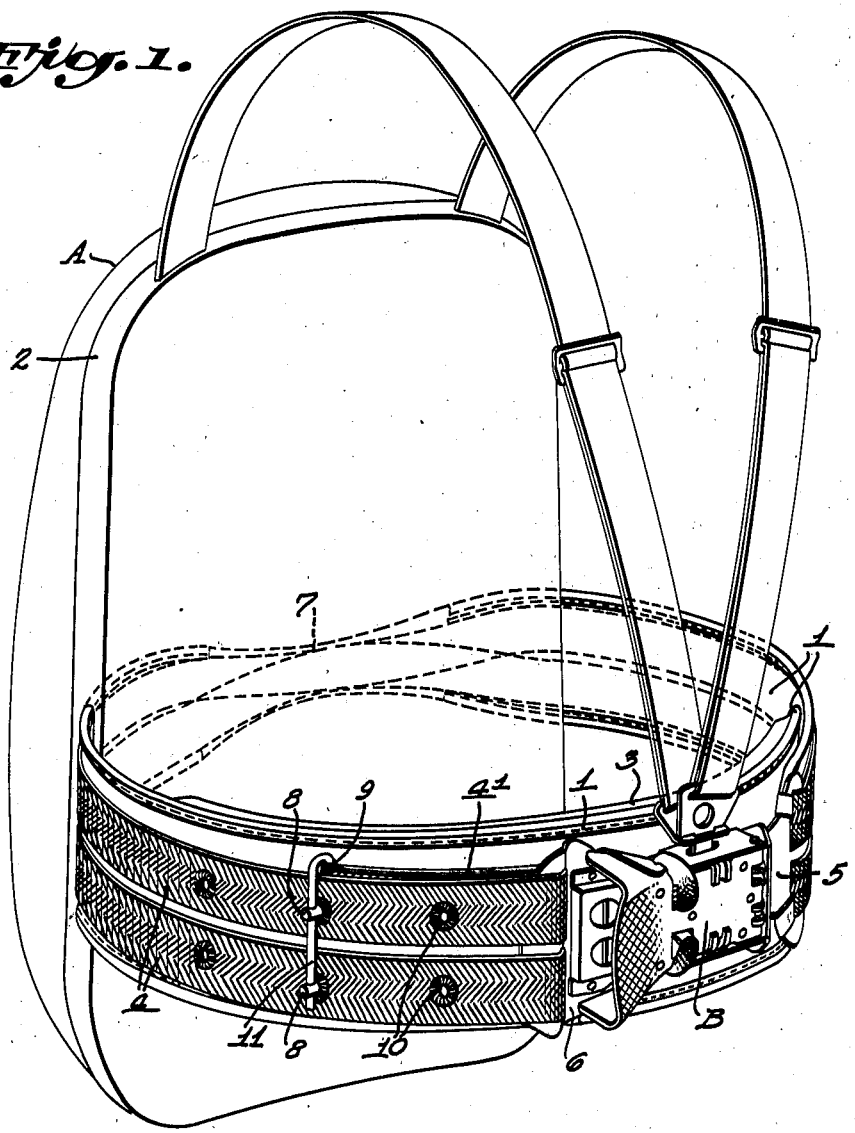
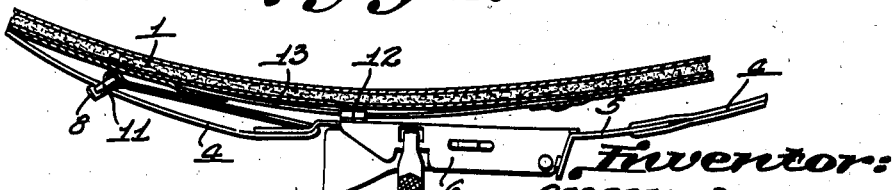
Inventor:
GEORGES DREYFUSS
By Attorney.

Patented June 20, 1944

2,351,938

UNITED STATES PATENT OFFICE 2,351,938

PARACHUTE BELT

Georges Dreyfus, Montauban, France; vested in the Alien Property Custodian

Application February 28, 1941, Serial No. 381,155
In France June 9, 1939

3 Claims. (Cl. 244—151)

The present invention relates to parachute belts or harnesses of the type adopted to permit of adapting to the parachutist the whole of the parachute and of the various elements associated therewith.

The chief object of the present invention is to provide a belt or harness of this kind which is better adapted to meet the requirements of practice than those used for the same purpose up to the present time.

According to a feature of the present invention, which concerns adjustment devices to be provided in connection with the belt, and in particular the strap of a parachute equipment as above mentioned, such a strap is arranged in such manner that the movable end thereof is folded and bent double under the main portion of the strap and can be secured through means operable from the outside, in various adjustment positions.

According to an advantageous embodiment of the present invention, the securing means above mentioned consist of projections carried by the folded portion of the strap and extending outwardly through holes provided in the main portion of the same strap, said projections being held in position by spindles engaging therethrough and which can be easily operated.

According to another feature of the present invention which is more particularly intended for use in connection with a parachute belt, said belt includes, on the one hand a portion of fixed length and, on the other hand, at least one strap superposed to said first part and of adjusted length, this strap cooperating with the closing buckle of the belt.

According to still another feature of the present invention, in the case of parachute belts provided with a buckle, such as above mentioned, at least one of the elements of the buckle is mounted in a slidable manner to the belt or to an element, and especially a metallic element fixed therewith.

Other features of the present invention will appear from the following detailed description of some specific embodiments thereof.

A preferred embodiment of the present invention will be hereinafter described with reference to the accompanying drawing, given merely by way of example, and in which:

Fig. 1 is a diagrammatic perspective view of the whole of a parachute bag and the belt thereof, this system being made according to the present invention.

Fig. 2 is a corresponding partial view in horizontal section.

In the following description, I will explain my invention as applied to the case of an adjustable parachute belt to be used in connection with the parachute bag A. This parachute belt includes a strap consisting of at least one strap element, the ends of which are adapted to be fixed, for instance, to the male and female portions of a buckle 3, capable of being closed and opened in a very quick manner. Of course, the ends of the strap, instead of being directly fixed to the parts of the buckle, might be fixed to elements rigidly assembled with said parts.

According to the invention, in order to permit of adjusting the length of the whole, one of the ends of said strap is folded inwardly, so that said strap portion is applied under the visible portion of the strap and is then fixed in the desired position through a suitable means adapted to be operated from the outside.

In the following description, it will be supposed that, according to still another feature of the invention, the belt is made of two parts, to wit:

(a) A first part 1 of fixed length, which is attached permanently to the wall 2 of bag A; this part 1 is fitted, over at least a portion of its length and on the inner side thereof, with cushioning means 3; in the embodiment shown by the drawing, these cushioning means are provided at the front part of the belt; and (b) A second part itself constituted by at least one and preferably two strap elements 4 of adjustable length, extending over the outer side of part 1.

The whole is for instance arranged in such manner that strap elements 4 are fixed at one end to one of the elements 5 of buckle B, where they may be secured together with the corresponding end of the part 1 of fixed length. These strap elements run along this part 1, being suitably assembled therewith, and are fixed at their other end to the other element 6 of the buckle, with respect to which they are adjustable. The last mentioned end of strap elements 4 are freely mounted with respect to the corresponding end of part 1.

This part 1 is made of such a length that its ends can overlap each other.

The rear straps 4 preferably cross each other in such manner as to constitute at 7 a portion which is very strong and preferably of reduced width, so as to permit the passage and the fixation of the loop or other element to which the lower ends of the suspending ropes from the parachute are all attached.

The length of the belt is then adapted in each particular case, to the size of the parachutist, owing to the possibility of suitably fixing the ends of the strap elements 4 which are attached to elements 6.

For this purpose and according to the arrangement above described, the ends 4¹ are folded inwardly and they are adjustably fixed to the outer portion 4.

Advantageously, these fixation means are of the type including projections provided with holes and a spindle adapted to engage in said holes.

More specifically, this fixation device includes, for instance, as shown by the drawing, the following elements:

(a) On the one hand projections 8 carried by a part 9 mounted at the end of portion 4¹ of the strap elements, these projections 8 being adapted to extend through holes 10 provided in the main portion of said strap element; and (b) On the other hand, a spindle 11, constituted by one of the branches of a hair-pin shaped clasp, the other branch of which engages for instance in part 9 which is correspondingly given the shape of a tube.

Finally, the whole is advantageously completed by means for guiding buckle B with respect to the belt. In the example shown by the drawing, these means consist for instance of a small projection 12 carried by elements 6 and guided on a strip of steel (or any other material) 13 fixed to the part 1 of the belt. The position of element 6 on said plate depends upon the desired adjustment.

Whatever be the particular embodiment that is chosen, I obtain a system, the working of which results sufficiently clearly from the preceding explanations for making it unnecessary to enter into further explanations.

This system has over analogous systems used for the same purpose up to the present time, many advantages, the most important of which are the following:

I eliminate any out projecting strap portion; the adjustment of the belt on the parachutist is very easy, The various pieces which are brought into place for the adjustment of the belt are perfectly guided, The whole of the belt is extremely strong and can be relied upon for standing any stresses.

In a general manner, whilst I have in the above description disclosed what I deem to be preferred embodiments of my invention, it should be well understood that I do not wish to be limited thereto as there might be changes made in the arrangement, disposition and form of the parts, without departing from the principle of the present invention, as comprehended within the scope of the appended claims.

What I claim is:

1. An adjustable belt for a parachute system which comprises, in combination, a band of fixed length adapted to be worn on the parachutist's body, a buckle including two elements separable from each other and an adjustable strap adapted to surround said band and permanently fixed at one end to one of said buckle elements, including a portion adapted to be folded between said strap and the parachutist's body, so as to form a loop engaging a part of the other buckle element, the portion of said strap that covers the folded portion thereof, being provided with a plurality of holes extending along a line transverse to said strap, a plurality of corresponding projections, carried by the folded portion, adapted to engage in said holes, a tube carried by the end of said folded portion and a double spindle including two branches, one adapted to be engaged in said tube and the other adapted to engage on said projections on the outside of the outer portion of the strap for locking said projections in their holes.

2. An adjustable belt for a parachute system, which comprises in combination a band of fixed length adapted to be worn on the parachutist's body, a buckle including two elements separable from each other, a strap including at least two adjustable strap elements, both adapted to surround said band and each permanently fixed at one end to one of said buckle elements, each strap element including a portion adapted to be folded between said strap and said band, so as to form a loop engaging a part of the other buckle element, the portion of said strap element that covers the folded portion thereof being provided with a plurality of holes arranged in such manner that the corresponding holes of the two respective strap elements are located along lines transverse to said strap elements, a projection carried by the folded portion of each strap element adapted to engage in any of the holes of the same strap element and a spindle slidably carried by these two strap elements and transverse with respect thereto, adapted to engage said projections for locking them in the corresponding holes.

3. In connection with a parachute system, a strap worn about the parachutist's body and adjustable to the size thereof, which comprises in combination an end portion integral with said strap and adapted to be folded between said strap and the parachutist's body, the portion of said strap that covers the folded portion thereof being provided with a plurality of holes extending along a line transverse to said strap, a plurality of corresponding projections, carried by the folded portion, adapted to engage in said holes, a tube carried by the end of said folded portion and a double spindle including two branches, one adapted to be engaged in said tube and the other adapted to engage in said projections on the outside of the outer portion of the strap for locking said projections in their holes.

GEORGES DREYFUS.